No. 742,771. PATENTED OCT. 27, 1903.
J. ARRINGTON.
TOOL.
APPLICATION FILED AUG. 22, 1903.
NO MODEL.
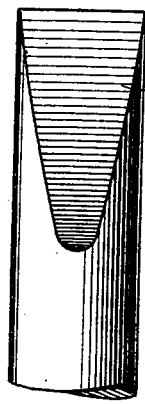
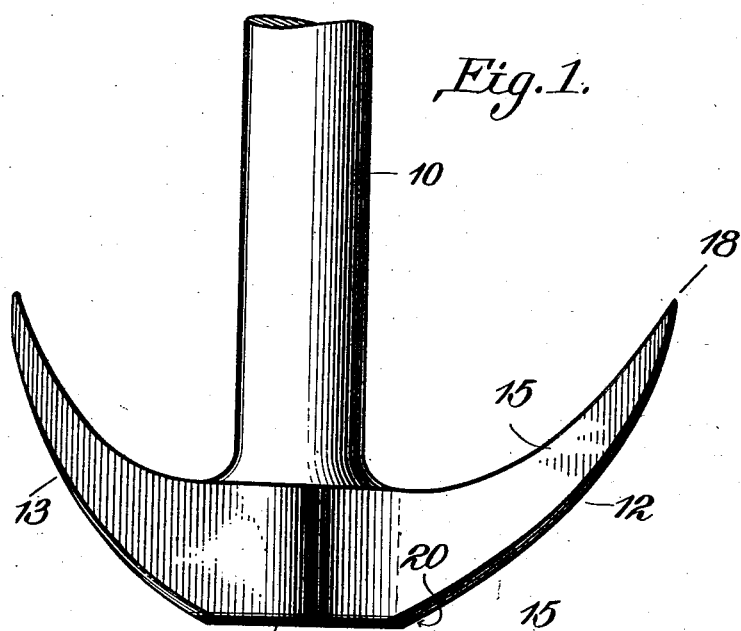
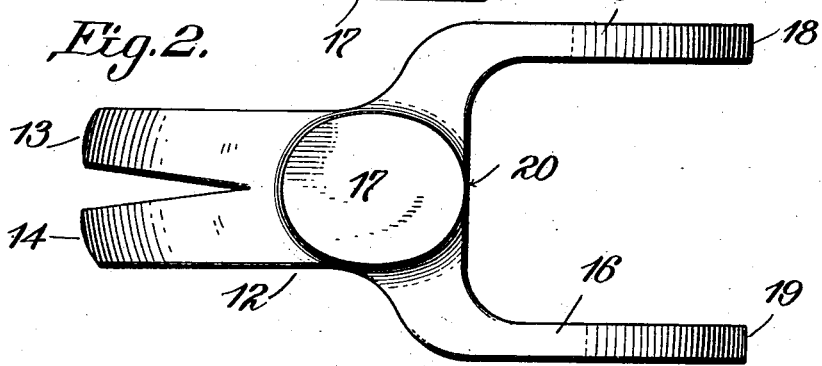

No. 742,771.

Patented October 27, 1903.

UNITED STATES PATENT OFFICE.

JOHN ARRINGTON, OF CALISTA, KANSAS.

TOOL.

SPECIFICATION forming part of Letters Patent No. 742,771, dated October 27, 1903.

Application filed August 22, 1903. Serial No. 170,454. (No model.)

*To all whom it may concern:*

Be it known that I, JOHN ARRINGTON, a citizen of the United States, residing at Calista, in the county of Kingman and State of Kansas, have invented a new and useful Tool, of which the following is a specification.

This invention relates to tools adapted for use in tearing down and repairing buildings and similar structures, and has for its object to produce a simply-constructed and easily applied and operated implement whereby the boarding, flooring, clapboards, sheathing, and similar parts may be detached from the joist and studding with the least possible injury to the material and with the expenditure of the minimum of labor.

The invention consists in a handle member terminating in a head having oppositely-extending spaced claws and an intermediate flattened hammer-face, one set of claws adapted to embrace the joist or studding and loosen the boards and the other set of claws adapted to draw the nails, and likewise consists in certain other novel features of construction, as hereinafter shown and described, and specifically pointed out in the claim following.

In the drawings, in which corresponding parts are denoted by like designating characters, Figure 1 is a side elevation, and Fig. 2 is a plan view, of the improved tool.

The improved tool or implement comprises a handle portion 10, preferably terminating at its free end in a wedge-shaped portion 11 and with a "head" portion at the other end, (represented as a whole at 12,) the head portion being preferably integral with the handle portion, as indicated. Extending laterally from the head portion, at one side of the handle portion, is a claw member having spaced side portions 13 14 and forming an ordinary nail-extracting claw of the usual shape and size employed on ordinary carpenters' hammers. Extending from the opposite side of the head portion is another claw, formed of members 15 16, relatively widely spaced and preferably longer than the claw members 13 14 and adapted to embrace the opposite sides of floor-joists, studding, and like parts of the structure to be dismembered. At its outer side in alinement with the handle portion the head member is flattened, as at 17, to form a hammer-surface, as shown.

With an implement thus constructed the workman can by placing the claw portions 15 16 upon opposite sides of the joist or studding, with the points 18 19 beneath the board to be removed, easily detach the board by pushing backward upon the handle member, the shoulder 20 thus bearing upon the joist or studding and becoming the "fulcrum" for the leverage exerted by the handle member.

When the board is partially withdrawn, together with the nails which hold it, the implement is detached and the hammer-face 17 employed to drive the board down to its former position, leaving the nail-head protruding. The claw portion 13 14 is then employed to remove the nail. The action is then repeated at each joist or studding to which the board is nailed.

By this simple device the building may be dismembered without destroying either the lumber or nails, as all can be thus easily saved.

When refractory nails are encountered, they can be severed by the chisel end 11 of the handle member and the boards thereby released without injuring them.

The implement enables the workman to operate very rapidly, and buildings may be thereby dismembered in much less time, and consequently with the expenditure of much less labor and at a greatly-reduced expense.

The tool will be of steel of suitable strength to resist the strains to which it will be subjected and may be of any required size and with the handle member of any suitable length.

It will be noted that the handle member and the two claw portions, together with the hammer portion, coact to produce the desired results and are combined in one useful and operative tool.

Having thus described my invention, what I claim is—

As a new article of manufacture, a tool comprising a handle member having a head formed with oppositely-extending spaced claws, the claws on one side of the handle member being relatively widely spaced and adapted to engage the opposite sides of floor-joist and studding, and the claws upon the other side forming a nail-extractor, the outer portion of the head which is in alinement with the handle member being flattened to form a hammer-face, substantially as described.

In testimony that I claim the foregoing as my own I have hereto affixed my signature in the presence of two witnesses.

JOHN ARRINGTON.

Witnesses:
FRED DEWEESE,
ARTHUR DEWEESE.